United States Patent
Tomonaga et al.

(10) Patent No.: US 9,138,728 B2
(45) Date of Patent: Sep. 22, 2015

(54) CATALYST FOR FORMING CARBON NANOTUBES

(71) Applicant: MITSUBISHI HEAVY INDUSTRIES, LTD., Tokyo (JP)

(72) Inventors: Nariyuki Tomonaga, Tokyo (JP); Tomoaki Sugiyama, Tokyo (JP); Yasushi Mori, Tokyo (JP); Takashi Kurisaki, Tokyo (JP); Takanori Suto, Tokyo (JP); Kota Kikuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/376,688

(22) PCT Filed: Feb. 22, 2013

(86) PCT No.: PCT/JP2013/054569
§ 371 (c)(1),
(2) Date: Aug. 5, 2014

(87) PCT Pub. No.: WO2013/125690
PCT Pub. Date: Aug. 29, 2013

(65) Prior Publication Data
US 2014/0378300 A1    Dec. 25, 2014

(30) Foreign Application Priority Data
Feb. 22, 2012    (JP) .................................. 2012-036174

(51) Int. Cl.
*B01J 23/58*    (2006.01)
*B01J 23/02*    (2006.01)
(Continued)

(52) U.S. Cl.
CPC .................. *B01J 23/78* (2013.01); *B01J 23/02* (2013.01); *B01J 35/002* (2013.01); *C01B 31/024* (2013.01); *C01B 31/0233* (2013.01)

(58) Field of Classification Search
CPC ....................................................... B01J 23/78
USPC .................................. 502/328, 340; 977/742
See application file for complete search history.

(56) References Cited

U.S. PATENT DOCUMENTS 5,759,939 A * 6/1998 Klabunde et al. .............. 502/328
6,387,843 B1 * 5/2002 Yagi et al. ...................... 502/328
(Continued)

FOREIGN PATENT DOCUMENTS

JP    2001-089116    4/2001
JP    2007-230816    9/2007
(Continued)

OTHER PUBLICATIONS

International Search Report issued Mar. 19, 2013, in corresponding International Application No. PCT/JP2013/054569.
(Continued)

*Primary Examiner* — Cam N. Nguyen
(74) *Attorney, Agent, or Firm* — Wenderoth, Lind & Ponack, L.L.P.

(57) ABSTRACT

The present invention provides a catalyst for forming carbon nanotubes that improves a yield at the time of manufacturing carbon nanotubes and enables continuous mass production of carbon nanotubes with high purity. The catalyst for forming carbon nanotubes of the present invention includes a carrier that includes MgO and a metal catalyst that is supported by the carrier, and the concentration of the MgO in the carrier is set equal to 99 mass % or higher.

9 Claims, 4 Drawing Sheets

(51) Int. Cl.
*B01J 23/06* (2006.01)
*B01J 23/78* (2006.01)
*B01J 35/00* (2006.01)
*C01B 31/02* (2006.01)

(56) References Cited

U.S. PATENT DOCUMENTS

| | | | |
|---|---|---|---|
| 6,531,638 B2 * | 3/2003 | Ingallina et al. | 585/444 |
| 6,635,191 B2 * | 10/2003 | Figueroa et al. | 252/373 |
| 6,878,667 B2 * | 4/2005 | Gaffney et al. | 502/241 |
| 7,348,293 B2 * | 3/2008 | Timken | 502/327 |
| 7,452,842 B2 * | 11/2008 | Wakatsuki et al. | 502/326 |
| 7,473,667 B2 * | 1/2009 | Hagemeyer et al. | 502/326 |
| 7,521,393 B2 * | 4/2009 | Blankenship et al. | 502/330 |
| 8,293,204 B2 * | 10/2012 | Khodadadi et al. | 423/447.3 |
| 8,304,367 B2 * | 11/2012 | Takahashi et al. | 502/335 |
| 2006/0245996 A1 * | 11/2006 | Xie et al. | 423/445 R |
| 2011/0014446 A1 | 1/2011 | Saito | |

FOREIGN PATENT DOCUMENTS

| | | |
|---|---|---|
| JP | 2008-280222 | 11/2008 |
| JP | 2011-148674 | 8/2011 |
| JP | 2011-255382 | 12/2011 |
| JP | 2012-31015 | 2/2012 |
| WO | 2009/008291 | 1/2009 |

OTHER PUBLICATIONS

Written Opinion of the International Searching Authority issued Mar. 19, 2013, in corresponding International Application No. PCT/JP2013/054569.

Sumio Iijima, "Helical microtubes of graphitic carbon", *Nature*, 354, 56-58, Nov. 7, 1991.

* cited by examiner

FIG. 5
(a)
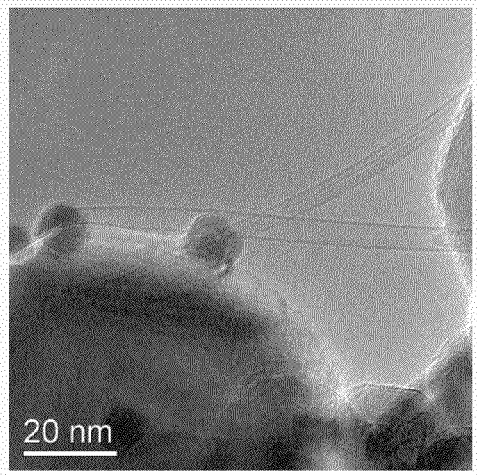
(b)
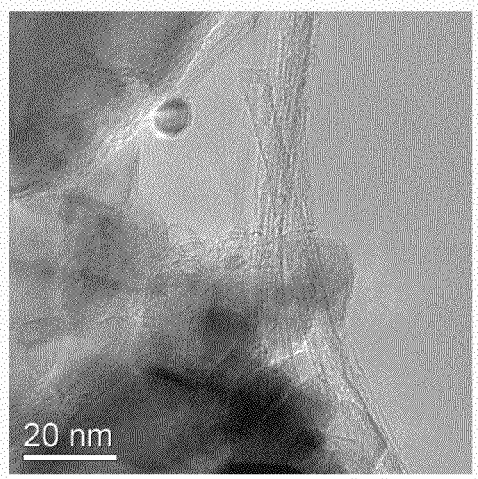
(c)
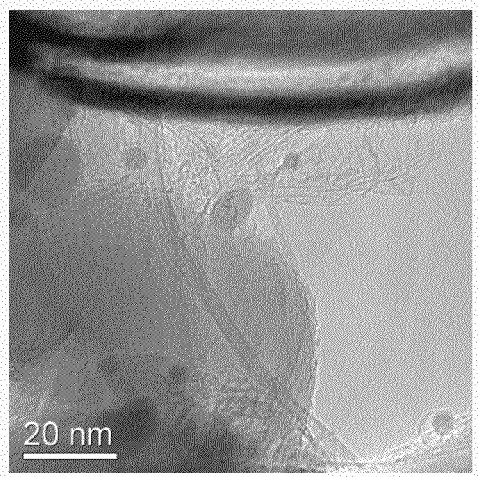

CATALYST FOR FORMING CARBON NANOTUBES

TECHNICAL FIELD

The present invention relates to a catalyst for forming carbon nanotubes, and more particularly, relates to a catalyst for forming carbon nanotubes which is used to form carbon nanotubes which are suitable as conductive fillers in fluidized beds.

Priority is claimed on Japanese Patent Application No. 2012-36174, filed Feb. 22, 2012, the content of which is incorporated herein by reference.

BACKGROUND ART

A carbon nanotube is a carbon polyhedron in a tube shape having a structure in which a black lead (graphite) sheet is closed in a cylindrical shape. Among such carbon nanotubes, there is a multi-walled nanotube having a multi-walled structure in which a black lead sheet is closed in a cylindrical shape and a single-walled nanotube having a single-walled structure in which a black lead sheet is closed in a cylindrical shape.

With regard to multi-walled nanotubes, Iijima found in 1991 that there were multi-walled nanotubes in the body of carbon deposited on the cathode of the arc discharge method (refer to Non-Patent Literature 1). Since then, research on multi-walled nanotubes has been actively conducted, and recently, multi-walled nanotubes have been massively synthesized on an industrial scale.

On the other hand, a single-walled nanotube generally has an inner diameter of approximately 0.4 to 10 nanometers (nm), and synthesis thereof was reported by Iijima and the IBM group at the same time in 1993. An electron state of a single-walled nanotube is theoretically predicted, and an electronic property is believed to change from a metallic quality to a semiconductive quality due to a particular method of spiral winding. Thus, single-walled nanotubes are regarded as a promising future electronic material. As other applications of such single-walled nanotubes, a nanoelectronics material, a field electron emitter, a high-directive radiation source, a soft X-ray source, a one-dimensional conductive material, a highly thermally transmissive material, a hydrogen storage material, and the like are considered. In addition, the application of single-walled nanotubes is expected to further expand due to functionalization of a surface, metal coating, and inclusion of substances.

In the related art, as a method for manufacturing large amounts of single-walled carbon nanotubes, the present inventors and the like have proposed several manufacturing methods that use fluidized beds (for example, refer to Patent Literature 1). According to the method described in Patent Literature 1, carbon nanotubes can be formed in large amounts using fluidized beds with use of granulated catalysts in which active catalytic materials are supported by carriers.

In addition, manufacture of a conductive film is performed in such a way that carbon nanotubes obtained using the above-described method and a resin are mixed, and a film is formed on a substrate (for example, refer to Patent Literature 2). According to the method described in Patent Literature 2, using a method called fluid gas-phase CVD (chemical vapor deposition), a raw material source that includes a catalyst, a reaction promoter, a carbon source, and the like is firstly supplied to a reaction region, and then a carbon nanotube is formed. In addition, Patent Literature 2 describes that an effect as an additive that promotes formation of carbon nanotubes is obtained due to sulfur (S) included in a carrier of a catalyst.

In addition, a method for manufacturing carbon nanotubes has also been proposed in such a way that functional groups are introduced into one end or both ends of a fibrous substance having hexagonal mesh pillar portions and the functional groups of the fibrous substance are caused to react with functional groups of another fibrous substance to connect the plurality of fibrous substances (for example, refer to Patent Literature 3). In addition, Patent Literature 3 also describes that sulfur (S) included in a carrier of a catalyst exhibits an effect of promoting formation of carbon nanotubes.

In addition, a carbon nanotube complex in which a metal is included is expected to exhibit a quantum effect, a conductive characteristic, a magnetic characteristic, and the like, unlike a material of the related art since the complex is in a state in which a nanoscale metal is stably held, and thus a formation method of a CNT complex that includes a metal has been proposed (for example, refer to Patent Literature 4).

CITATION LIST

Patent Literature

[Patent Literature 1]
  Japanese Unexamined Patent Application, First Publication No. 2007-230816
[Patent Literature 2]
  PCT International Publication No. WO 2009/008291
[Patent Literature 3]
  Japanese Unexamined Patent Application, First Publication No. 2008-280222
[Patent Literature 4]
  Japanese Unexamined Patent Application, First Publication No. 2001-89116

Non Patent Literature

[Non Patent Literature 1]
  S. Iijima, Nature, 354,56 (1991)

SUMMARY OF INVENTION

Technical Problem

When carbon nanotubes are manufactured using the methods described in Patent Literatures 2 and 3, however, there are problems in that the effect of promoting the formation of the carbon nanotubes is not obtained as expected and it is difficult to improve manufacture efficiency. This is considered to be due to the fact that impurities in the carrier of the catalyst used in the manufacture of the carbon nanotubes are not appropriately reduced. For this reason, introduction of a catalyst that enables mass production of carbon nanotubes with a good yield has been desired.

In addition, there is a problem that the method for forming carbon nanotubes disclosed in Patent Literature 4 is not suitable for mass production since a reaction tube is used therein. In addition, because a formed metal-inclusive carbon nanotube is a multi-walled carbon nanotube including two or more layers, a technique that enables mass production of metal-inclusive single-walled nanotubes has not been proposed.

The present invention has been achieved taking the above problems into consideration, and aims to provide a catalyst for improving the yield when carbon nanotubes are manufactured, which enables continuous mass production, and is optimum for mass production of single-walled nanotubes that include a metal.

Solution to Problem

In order to solve the above problems, the present inventors have diligently reviewed catalysts used in manufacturing carbon nanotubes. As a result, they found that, by appropriately controlling a concentration of impurities included in carriers in granulated catalysts formed by supporting metals with use of MgO (magnesium oxide) in the carriers, an amount of formed carbon nanotubes increases. In other words, they found that, by raising the concentration of MgO in the carriers, the yield of the carbon nanotubes is improved and thus mass production thereof is possible, and thereby the present invention was completed.

In other words, a catalyst for forming carbon nanotubes of the present invention includes a carrier that includes MgO and a metal catalyst that is supported by the carrier, and is characterized that the concentration of the MgO in the carrier is equal to 99 mass % or higher.

According to the catalyst for forming carbon nanotubes of the configuration, by setting the concentration of MgO in the carrier equal to 99% or higher, reaction of a raw material source in a fluidized bed is prompted, and the yield of the formed carbon nanotubes is improved.

In addition, a concentration of sulfur in the carrier is preferably equal to 1 mass % or lower in the catalyst for forming carbon nanotubes of the above configuration.

In the catalyst for forming carbon nanotubes of this configuration, particularly by strictly limiting the concentration of S (sulfur) that is impurities included in the carrier to be equal to I mass % or lower, the yield of the carbon nanotubes can be further improved.

Advantageous Effects of Invention

According to the catalyst for forming carbon nanotubes of the present invention, by setting the concentration of MgO in a carrier equal to 99 mass % or higher, a yield at the time of manufacturing carbon nanotubes using the catalyst is remarkably improved. Thus, carbon nanotubes having high purity can be mass-produced with efficiency.

BRIEF DESCRIPTION OF DRAWINGS

FIG. 5 shows TEM photographs of generated carbon nanotubes that include iron atoms.

DESCRIPTION OF EMBODIMENTS

Hereinafter, a catalyst for forming carbon nanotubes of the present invention will be described in detail appropriately referring to drawings.

Figure 1:
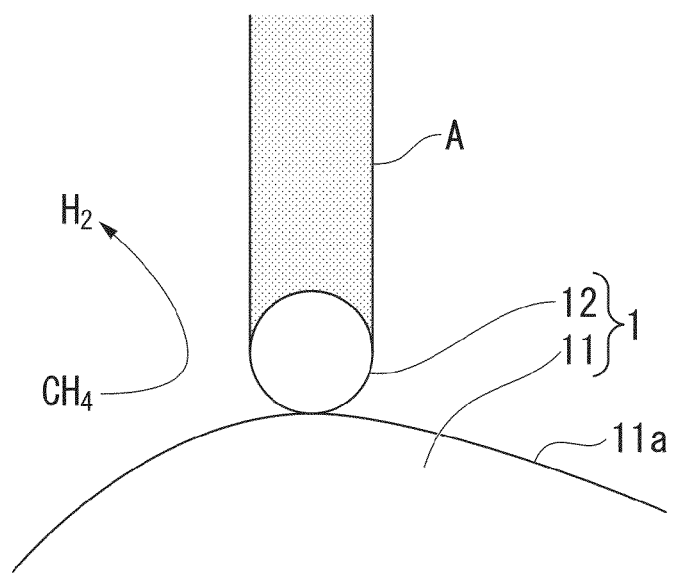
FIG. 1 is a diagram for describing a catalyst for forming carbon nanotubes that include a carrier and a metal catalyst and is a schematic diagram showing a state in which carbon nanotubes are formed from the metal catalyst.
Figure 2:
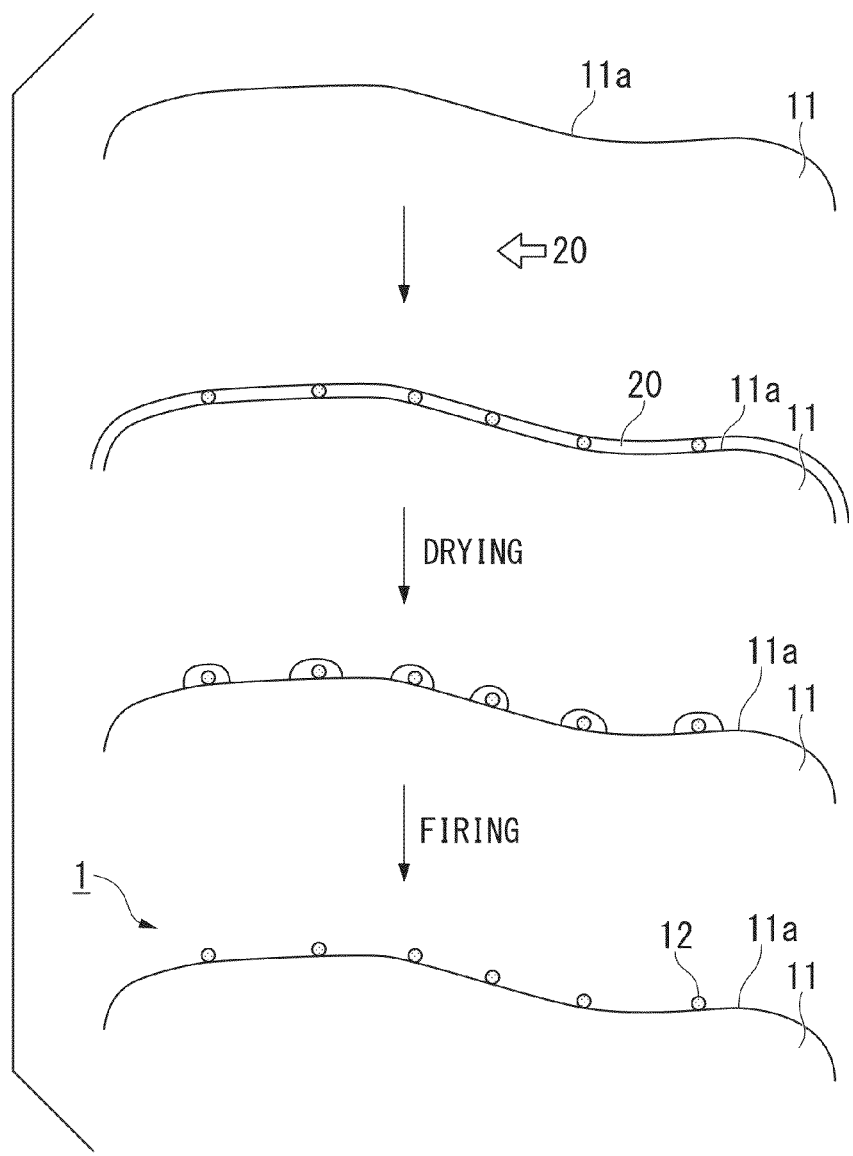
FIG. 2 is a schematic diagram for describing a method for manufacturing the catalyst for forming carbon nanotubes shown in FIG. 1.
Figure 3:
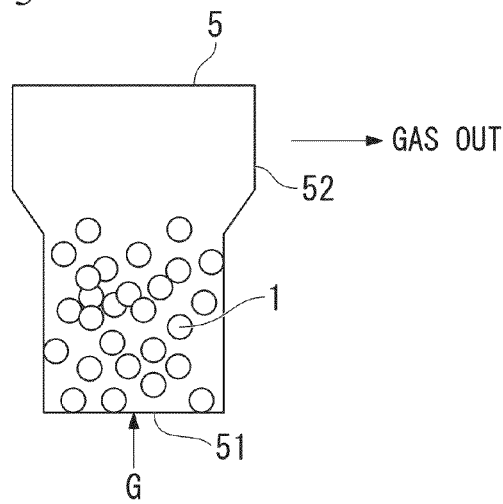
FIG. 3 is a schematic diagram for describing a step in which the catalyst for forming carbon nanotubes fills a fluidized bed and raw material gas is supplied to form carbon nanotubes.
Figure 4:
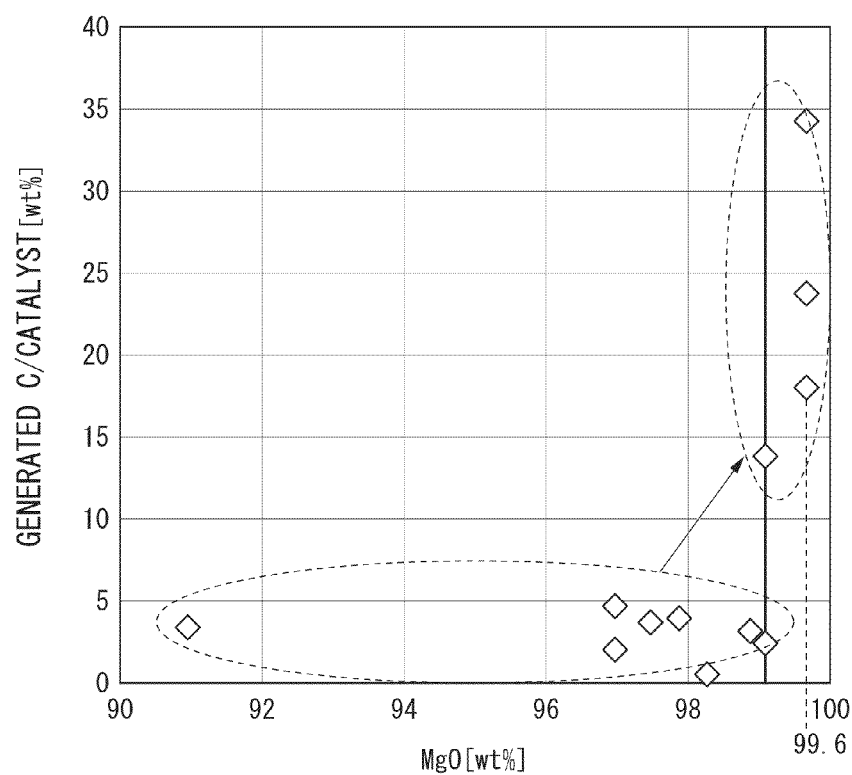
FIG. 4 is a graph representing the relationship between MgO concentrations in a carrier configuring the catalyst for forming carbon nanotubes and ratios of an amount of formed carbon nanotubes to an amount of catalyst.

FIGS. 1 to 5 are diagrams for describing an embodiment of the catalyst for forming carbon nanotubes of the present invention, FIG. 1 is a diagram showing the catalyst for forming carbon nanotubes that includes a carrier that includes MgO and a metal catalyst that is supported by the carrier. FIG. 2 is a diagram for describing an example of a method for manufacturing the catalyst for forming carbon nanotubes shown in FIG. 1. FIG. 3 is a diagram showing a step in which the catalyst for forming carbon nanotubes fills a fluidized bed raw material gas is supplied to form carbon nanotubes. FIG. 4 is a graph in which a concentration of MgO used for a carrier configuring the catalyst for forming carbon nanotubes is set as the horizontal axis and the ratio of an amount of formed carbon nanotubes to an amount of catalyst is set as the vertical axis to show the relationship thereof. FIG. 5 is a TEM photograph showing generated carbon nanotubes that include iron atoms.

As described above, the present inventors and the like diligently reviewed improvement of the yield at the time of manufacturing carbon nanotubes using a fluidized bed. Then, by employing a configuration of a further heightened concentration of MgO in a granulated catalyst in which an active catalytic metal such as Fe is supported by a carrier that includes MgO, it was ascertained that the yield of carbon nanotubes was improved, and thereby the present invention was completed.

In other words, as shown in FIG. 1, the catalyst for forming carbon nanotubes (which may be hereinafter simply abbreviated to a catalyst) 1 of the present embodiment is schematically configured to include a carrier 11 that is configured to include MgO and a metal catalyst 12 that is supported by this carrier, and such that a concentration of MgO in the carrier is set equal to 99 mass % or higher.

Hereinafter, the reason for regulating components of the catalyst 1 of the present embodiment will be described in detail. Note that "%" which represents concentration in the following description below is assumed to indicate "mass %" unless particularly specified otherwise.

The carrier 11 configuring the catalyst 1 of the present embodiment includes MgO, and a concentration of MgO is set equal to 99% or higher. This is because, if the concentration of MgO in the carrier is set to less than 99%, the catalytic function deteriorates because a ratio of impurities with respect to the carrier increases, and a yield of carbon nanotubes formed from the metal catalyst is reduced. If the concentration of MgO in the carrier 11 is set equal to 99% or higher, reaction of raw material sources in a fluidized bed to be described later (refer to reference numeral 5 of FIG. 3) is promoted, and the yield of generated carbon nanotubes A can be improved.

Herein, the reason that reactivity increases by setting the concentration of MgO in the carrier 11 equal to 99% or higher and thereby the yield of carbon nanotubes A is improved will be described with reference to the graph of FIG. 4.

In the graph of FIG. 4, the horizontal axis represents the concentration of MgO in the carrier 11 configuring the catalyst 1, and the vertical axis represents the ratio of an amount of formed carbon nanotubes A to an amount of the catalyst 1. As shown in FIG. 4, in the range of the concentration of MgO in the carrier 11 of around 97% to less than 99%, the amount of formed carbon nanotubes A with respect to the amount of the catalyst 1 is about 1 to 5%, which is a low yield. On the other hand, if the concentration of MgO in the carrier 11 exceeds 99%, the amount of formed carbon nanotubes A with respect to the amount of catalyst 1 is about 14 to 35%, from which it is ascertained that a yield thereof is quite high.

Note that, as a carrier used for the catalyst for forming carbon nanotubes, there are generally, for example, aluminum compounds such as alumina, silica, sodium aluminate, alum, and aluminum phosphate, calcium compounds such as calcium oxide, calcium carbonate, and calcium sulfate, apatite-system materials such as calcium phosphate, and magnesium phosphate, and the like, in addition to MgO, and among magnesium compounds, there are magnesium hydroxide, magnesium sulfate, and the like, and the materials can be appropriately employed, but when efficiency in formation of carbon nanotubes is considered, it is preferable to use highly concentrated MgO described in the present embodiment.

In addition, in the catalyst for forming carbon nanotubes 1 of the present embodiment, the concentration of MgO in the carrier 11 is preferably high and the amount of impurities is preferably small as described above, but among the impurities, it is particularly preferable to set sulfur (S) to have a concentration of equal to 1% or lower in view of improvement of a yield of carbon nanotubes A.

Note that, as MgO with a high concentration and low sulfur concentration as described above, for example, puremag FNM-G manufactured by Tateho Chemical Industries Co., Ltd., KISUMA 5Q manufactured by Kyowa Chemical Industry Co., Ltd., and the like can be used.

As the metal catalyst 12 which configures the catalyst 1 of the present embodiment and is supported on a surface 11a of the carrier 11 described above, for example, any one kind of V, Cr, Mn, Fe, Co, Ni, Cu, and Zn or a combination thereof can be employed. In addition, among these, it is particularly preferable to employ Fe as the metal catalyst 12 in view of improvement of a yield of the carbon nanotubes A.

Next, an example of the method for manufacturing the catalyst for forming carbon nanotubes 1 described above will be described with reference to FIG. 2.

When the catalyst 1 of the present embodiment is manufactured, for example, first, a nanometal aqueous solution 20 composed of a nanometal (for example, Fe, or the like) that is a metal of which the particle diameters are controlled is applied onto the surface 11a of the carrier 11, and then dried. Then, a method for supporting the nanometal that is the metal catalyst (Fe) 12 on the surface 11a of the carrier 11 can be employed by firing the carrier. At this time, the materials described above can be employed as the carrier 11 and the metal catalyst 12.

Next, an example of a method for forming and manufacturing the carbon nanotubes A using the catalyst for forming carbon nanotubes 1 described above will be described with reference to FIG. 3.

When the carbon nanotubes A are to be manufactured, the fluidized bed 5 exemplified in FIG. 3 can be used. The fluidized bed 5 is configured by having the inside filled with the catalyst 1, and by receiving supply of a raw material gas (carbon source) G from a raw material gas supply port 51 in the lower part of the bed. An unreacted gas and a surplus gas in the raw material gas G are configured to be discharged from the discharge port 52.

When the carbon nanotubes A are manufactured using the fluidized bed 5 as above, first, while the catalyst for forming carbon nanotubes 1 that is a fluidized material are put into the inside of the fluidized bed 5 and made to flow, the raw material gas G is supplied from the raw material gas supply port 51 so as to be subject to reaction. Accordingly, from the miniaturized metal catalyst 12 that is supported on the surfaces 11a of the carriers 11, carbon materials in tube shapes of a nanometer order sequentially grow as shown in FIG. 1. Accordingly, the carbon nanotubes A can be formed from the catalysts 1.

Note that, when the carbon nanotubes A are manufactured in the fluidized tube scheme using the catalysts 1 of the present embodiment, the average particle diameter of the catalyst 1 is preferably in the range of 0.1 to 10 mm, or more preferably in the range of 0.5 to 2 mm, in view of improvement of the yield.

In addition, the raw material gas G that is the carbon source is not particularly limited as long as it is a compound containing carbon, but in addition to CO and $CO_2$, for example, alkanes such as methane, ethane, propane, and hexane, unsaturated organic compounds such as ethylene, propylene, and acetylene, aromatic compounds such as benzene, and toluene, organic compounds having an oxygenated functional group such as alcohols, ethers, and carboxylic acids, polymeric materials such as polyethylene and polypropylene, or petroleum oil or coals (including gas converted from coals), and the like can be exemplified. In addition, in view of control of oxygen concentration, a combination of two or more of CO, $CO_2$, $H_2O$, alcohols, ethers, carboxylic acids and the like which are oxygenated carbon sources, and carbon sources that do not include oxygen can also be supplied.

In addition, when the catalyst 1 is manufactured, the inside of the fluidized bed 5 is preferably set to a temperature in the range of 300° C. to 1300° C., and more preferably in the range of 400° C. to 1200° C. By setting the temperature of the inside of the fluidized bed 5 to be constant at a proper temperature as above described and having the raw material gas G that is a carbon raw material such as methane come into contact with the catalyst 1 for a fixed time under a coexistence environment of an impurity carbon decomposition substance, the carbon nanotube A is formed from the metal catalyst 12 that is supported by the carrier 11 as shown in FIG. 1.

As described above, according to the catalyst for forming carbon nanotubes 1 of the present invention, by setting the concentration of MgO in the carrier 11 equal to 99 mass % or higher, the yield obtained at the time of manufacturing carbon nanotubes using the catalyst 1 is dramatically improved. Therefore, carbon nanotubes having high purity can be mass-produced with efficiency.

EXAMPLE

Hereinafter, the catalyst for forming carbon nanotubes of the present invention will be described in more detail by showing an example, however, the present invention is not limited to the example.

[Manufacturing of a Sample Material (a Sample of the Catalyst)]

In the present example, first, MgO carrier particles set to have each of the concentrations shown in Table 1 below were prepared as carriers. Then, a nanometal aqueous solution that included Fe was applied onto the surfaces of the carriers that included MgO using a known method of the related art as shown in FIG. 2, and then dried. Then, by firing the carriers, catalysts for forming carbon nanotubes of the example of the present invention and of a comparative example, in which nanometals (metal catalyst: Fe) were supported on the surfaces of the MgO carriers, were produced.

[Evaluation Test Item]

Various evaluation tests of items to be described below were executed for the sample materials produced in the above-described steps.

[Yield at the Time of Manufacturing Carbon Nanotubes]

Carbon nanotubes were manufactured using the fluidized bed 5 which served as a manufacturing device as shown in FIG. 3 and the sample materials of the catalysts which were manufactured in the above-described steps, and yields at the time of the manufacturing were investigated.

First, while the catalysts which were fluidized materials serving as sample materials were put into the inside of the fluidized bed 5 and caused to flow, methane gas was supplied as the raw material gas G from the raw material gas supply port 51. The temperature of the inside of the fluidized bed 5 at that moment was set to be constant at 860° C., and a circulation time of the methane gas was set to be one hour. By causing the methane gas to come into contact with the catalysts serving as the sample material under these conditions and through these steps, carbon nanotubes A were formed from the metal catalysts that were supported by the carriers as shown in FIG. 1, and then continuous manufacturing was performed.

In addition, the yield at the time of forming the carbon nanotubes in the above-described steps was calculated based on the ratio obtained by dividing the amount of the formed carbon nanotubes A by the amount of the sample material (catalyst 1) that filled the fluidized bed 5, and the result is shown in Table 1 below.

TABLE 1

| SAMPLE | MgO PURITY (MASS %) | $SO_3$ (%) | CNT YIELD (%) |
|---|---|---|---|
| K1 | 99.9 |  | 17.1 |
| T1 | 99.6 | 0.04 | 34.2 |
| T2 | 99.6 | 0.04 | 23.7 |
| T3 | 99.7 | 0.02 | 17.9 |
| T4 | 99.1 | 0.12 | 13.9 |
| T5 | 99.0 | 0.13 | 29.8 |
| T6 | 99.9 |  | 13.0 |
| T7 | 99.1 | 0.13 | 11.4 |
| T8 | 99.6 | 0.14 | 5.8 |
| T9 | 99.1 | 0.1 | 2.8 |
| T10 | 98.9 | 0.12 | 3.1 |
| T11 | 97.5 | 1.31 | 3.6 |
| T12 | 97.5 |  | 3.5 |
| Ka | 98.3 |  | 0.5 |
| To | 97.9 |  | 3.9 |
| U1 | 97.0 | 1.81 | 4.7 |
| U2 | 97.0 | 1.35 | 1.9 |
| O1 | 92.6 |  | 3.5 |

[Evaluation Result]

As shown in Table 1, it is ascertained that, in the example in which carbon nanotubes were manufactured using the catalyst for forming carbon nanotubes using MgO having a concentration defined in the present invention as carriers in a method using the fluidized bed, the yields of the carbon nanotubes were 14 to 35%, which are quite excellent. Among these, it is ascertained that, when the concentration of sulfur in the carriers is equal to 1% or lower, in addition to the concentration of MgO, the carbon nanotubes were obtained with higher yields.

In addition, the carbon nanotubes formed using the catalyst for forming carbon nanotubes of the present invention were observed through a TEM (Transmission Electron Microscope). According to the TEM photographs shown in FIG. 5, it was found that the formed carbon nanotubes were single-walled carbon nanotubes that included metals.

On the other hand, it was found that, in the comparative example in which carriers were composed using MgO having a lower concentration defined in the present invention and then carbon nanotubes were manufactured using catalysts for forming carbon nanotubes of a configuration of the related art in which metal catalysts were supported on surface of the carrier, the yields were about 2 to 5%, which are poor yields in comparison with the example described above.

The result of each evaluation test described above has demonstrated that the catalyst for forming carbon nanotubes of the present invention is excellent in the yield at the time of forming carbon nanotubes, and further, is suitable for mass production of single-walled carbon nanotubes that contain metals.

Industrial Applicability

According to the catalyst for forming carbon nanotubes of the present invention, since the concentration of MgO in the carriers is set equal to 99 mass % or higher as described above, the yield at the time of manufacturing carbon nanotubes is dramatically improved, and thus mass production of carbon nanotubes having high purity can be realized.

Reference Signs List

1 Catalyst for forming carbon nanotubes (catalyst)
11 Carrier (MgO)
11a Surface (carrier)
12 Metal catalyst
A Carbon nanotube

The invention claimed is:

1. A catalyst for forming carbon nanotubes, comprising:
a carrier including MgO; and
a metal catalyst supported by the carrier,
wherein a proportion of the MgO in the carrier is equal to 99 mass % or higher.

2. The catalyst for forming carbon nanotubes according to claim 1, wherein a proportion of sulfur in the carrier is equal to 1 mass % or lower.

3. The catalyst for forming carbon nanotubes according to claim 1, wherein the metal catalyst supported by the carrier is Fe.

4. The catalyst for forming carbon nanotubes according to claim 1, wherein the catalyst has an average particle diameter in a range of 0.1 to 10 mm.

5. A method for forming carbon nanotubes, comprising:
filling a fluidized bed with the catalyst for forming carbon nanotubes according to claim 1; and
supplying a raw material gas as a source of carbon from a raw material gas supply port disposed in the fluidized bed,
wherein the catalyst for forming carbon nanotubes is filled into the fluidized bed and made to flow within the fluidized bed.

6. The method for forming carbon nanotubes according to claim 5, wherein a proportion of sulfur in the carrier is equal to 1 mass % or lower.

7. The method for forming carbon nanotubes according to claim 5, wherein the metal catalyst supported by the carrier is Fe.

8. The method for forming carbon nanotubes according to claim 5, wherein the catalyst has an average particle diameter in a range of 0.1 to 10 mm.

9. The method for forming carbon nanotubes according to claim 5, wherein a temperature inside of the fluidized bed is set to a range of 300° C. to 1300° C.

* * * * *